Patented Feb. 22, 1949

2,462,352

UNITED STATES PATENT OFFICE 2,462,352

HEAT STABLE COMPOSITIONS COMPRISING POLYMERIC VINYLIDENE CHLORIDE AND PHENOTHIOXINE OR CERTAIN DERIVATIVES THEREOF

Raymond F. Boyer, Lorne A. Matheson, and Robert C. Reinhardt, Midland, Mich., assignors to The Dow Chemical Company, Midland, Mich., a corporation of Delaware No Drawing. Application May 28, 1945,
Serial No. 596,402

4 Claims. (Cl. 260—92.5)

This invention relates to compositions of matter containing polymeric vinylidene chloride products and stabilizing agents to protect the polymeric product from thermal decomposition.

The polymer of vinylidene chloride and many of its copolymers have been described in patents and in other literature during recent years. Such polymeric bodies, and compositions containing them, are herein referred to as polymeric vinylidene chloride products. It has been found that such products tend to darken after prolonged exposure to elevated temperatures. This darkening is accompanied by a change in the other physical properties of the polymeric product and is assumed to be an evidence of partial decomposition. Because of the many desirable properties of polymeric vinylidene chloride products, a means is sought to overcome or to prevent the tendency for such products to darken on heating.

It is accordingly among the objects of the present invention to provide a composition of matter comprising a polymeric vinylidene chloride product stabilized against the darkening and decompositional effects of heat. A related object is to provide a heat stabilizer for polymeric vinylidene chloride products. A particular object is to provide a stabilizer, as aforesaid, which will prevent polymeric vinylidene chloride products containing it from exhibiting more than half of the amount of darkening on prolonged heating that is shown by the untreated polymeric product when heated under similar conditions. Other and related objects may appear hereinafter.

It has now been found that the foregoing and related objects may be attained through the incorporation in polymeric vinylidene chloride products of small amounts, generally in the range of from about 2 to about 10 per cent by weight, of phenothioxine or certain of its substitution products. The preferred stabilizer is a compound from the group of phenothioxine, its oxide, and the chloro, phenyl and cyclohexyl substitution products thereof, conforming to the general formula

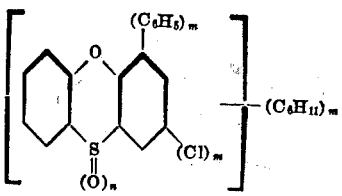

wherein $n$ and each $m$ may independently have one of the values 0 and 1, the sum of the values of the letters $m$ not exceeding 2, it being understood that when any $m$ is zero, the vanishing substituent is replaced by hydrogen. Specific compounds of the class disclosed, all of which have been found useful in the present invention, include phenothioxine; 3-chlorophenothioxine; 1-phenyl phenothioxine; $x$-cyclohexyl,3-chlorophenothioxine; $x$-cyclohexyl,1-phenyl phenothioxine; phenothioxine-10-oxide; 3-chlorophenothioxine-10-oxide; 1-phenyl phenothioxine-10-oxide; $x$-cyclohexyl phenothioxine-10-oxide; $x$-cyclohexyl,3-chloro-phenothioxine-10-oxide; $x$-cyclohexyl,1-phenyl phenothioxine-10-oxide. In the foregoing list of compounds and in the following table, the letter "$x$" is used to denote an unknown position of substitution. Thus, $x$-cyclohexyl phenothioxine-10-oxide refers to the compound having the structural formula given above, wherein the number of chlorine atoms is zero and there is one each of oxygen, phenyl and cyclohexyl in the relations shown, the precise position of the cyclohexyl group being unknown. The corresponding dioxides have been tried and found to be less effective, and their use is accordingly not claimed.

The invention has been found to be applicable, not only to the polymeric vinylidene chloride products which are normally fabricated by molding or extrusion operations at elevated temperatures, but also to those polymeric products which are soluble in various organic solvents and which may be applied as surface coatings and thereafter subjected to elevated temperatures. The latter class of copolymer includes the one which is specifically set forth in the following example.

A copolymer of about 85 per cent vinylidene chloride and about 15 per cent of ethyl acrylate by weight was dissolved to form a 20 per cent solution in dioxane. The solution was divided into several portions, to some of which were added 3 per cent by weight, based on the amount of polymer present, of phenothioxine or one of the other related compounds listed in the following table. After the addition agent had been dissolved and dispersed through the solution, films were cast on clean glass plates. The films were then dried and were exposed for various lengths of time to the effects of heat in an oven maintained at 90° C. The amount of decomposition was judged from the darkening of the various samples and this in turn was evaluated by measuring the amount of visible light transmitted through the samples under standard conditions. Those samples showing the greatest amount of protection, due to the added agent, transmitted greater amounts of the available light than did those which were less effectively protected.

Table

| Heat Stabilizing Agent | Per Cent Available Visible Light Transmitted Through Samples Previously Heated at 90° C. for Indicated Time ||||||| 
|---|---|---|---|---|---|---|---|
| | 0 hrs. | 1 hr. | 2 hrs. | 5 hrs. | 8 hrs. | 16 hrs. | 24 hrs. |
| Blanks (average) | 87 | 70 | 68 | 64 | 61 | 45 | 22 |
| Phenothioxine | 89 | 88 | 88 | 86 | 82 | 68 | 61 |
| 3-Chlorophenothioxine | 88 | 85 | 84 | 83 | 79 | 68 | 52 |
| 1-Phenyl phenothioxine | 89 | 85 | 85 | 85 | 79 | 63 | 54 |
| r-Cyclohexyl phenothioxine | 87 | 85 | 85 | 84 | 80 | 64 | 44 |
| r-Cyclohexyl, 3-chlorophenothioxine | 89 | 88 | 88 | 87 | 84 | 73 | 62 |
| r-Cyclohexyl, 1-phenyl phenothioxine | 85 | 70 | 70 | 68 | 61 | 52 | 51 |
| Phenothioxine-10-oxide | 87 | 74 | 73 | 73 | 68 | 51 | 47 |
| 3-Chlorophenothioxine-10-oxide | 91 | 86 | 86 | 86 | 85 | 82 | 80 |
| 1-Phenyl phenothioxine-10-oxide | 87 | 81 | 81 | 79 | 72 | 65 | 63 |
| r-Cyclohexyl phenothioxine-10-oxide | 88 | 81 | 81 | 81 | 81 | 76 | 70 |
| r-Cyclohexyl, 3-chloro-phenothioxine-10-oxide | 86 | 84 | 84 | 84 | 81 | 74 | 72 |

When dealing with polymeric products which are not soluble in organic solvents, the stabilizing agent is dispersed through the granulated or powdered mixture to be employed in the molding or extrusion operation and the resulting composition is found to resist the darkening effects of heat to about the same extent as is indicated in the foregoing table.

It is noted that after 24 hours exposure to a temperature of 90° C. the samples reported in the table which contained the phenothioxine compounds were all at least 100 per cent better than the blanks. In other words, the amount of darkening in the treated samples was in no case more than half as great as that in the blank, after 24 hours.

All of the compositions reported in the foregoing table, except the blanks, contain 3 per cent of the particular stabilizing agent. Other tests have indicated that the amount of stabilizer may be as little as 2 per cent, or even less, especially when the thermal conditions to be encountered by the composition are not extreme. In no case has it been found advantageous or desirable to employ more than about 10 per cent of these compounds for their stabilizing effect. Larger quantities may, of course, be employed for plasticizing or other effects which may be contributed by them.

We claim:

1. A composition of matter comprising a polymeric vinylidene chloride product which tends to darken when heated and, as a heat stabilizing agent therefor, from 2 to 10 per cent by weight of a compound having the general formula

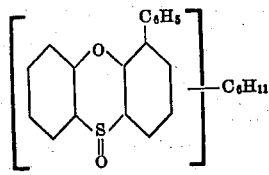

where $n$ and each $m$ may independently have one of the values 0 and 1, the sum of the values of the letters $m$ not exceeding 2.

2. A composition of matter containing a polymeric vinylidene chloride product which tends to darken when heated, and, as a heat stabilizing agent therefor, from 2 to 10 per cent by weight of phenothioxine.

3. A composition of matter comprising a polymeric vinylidene chloride product which tends to darken when heated, and, as a heat stabilizing agent therefor, from 2 to 10 per cent by weight of 1-phenyl phenothioxine-10-oxide.

4. A composition of matter comprising a polymeric vinylidene chloride product which tends to darken when heated, and, as a heat stabilizing agent therefor, from 2 to 10 per cent by weight of a mono-cyclohexyl,1-phenyl phenothioxine-10-oxide, having the formula

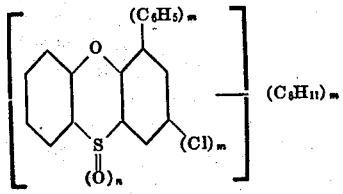

RAYMOND F. BOYER.
LORNE A. MATHESON.
ROBERT C. REINHARDT.

REFERENCES CITED

The following references are of record in the file of this patent:

UNITED STATES PATENTS

| Number | Name | Date |
|---|---|---|
| 2,221,819 | Smith and Moll | Nov. 19, 1940 |
| 2,221,820 | Smith and Moll | Nov. 19, 1940 |
| 2,273,905 | Smith and Moll | Feb. 24, 1942 |
| 2,319,954 | Scott | May 25, 1943 |
| 2,344,489 | Boyer et al. | Mar. 21, 1944 |